Oct. 6, 1959

H. C. WENDT 2,907,213

ELECTRICAL TELEMETERING SYSTEMS

Filed Oct. 1, 1956

Inventor:
Harry C. Wendt
by Richard E. Hosley
His Attorney

Oct. 6, 1959 H. C. WENDT 2,907,213
ELECTRICAL TELEMETERING SYSTEMS
Filed Oct. 1, 1956 2 Sheets-Sheet 2

Inventor:
Harry C. Wendt
by Richard E. Horley
His Attorney

United States Patent Office 2,907,213
Patented Oct. 6, 1959

2,907,213

ELECTRICAL TELEMETERING SYSTEMS

Harry C. Wendt, Lynnfield Center, Mass., assignor to General Electric Company, a corporation of New York Application October 1, 1956, Serial No. 613,038

9 Claims. (Cl. 74—5.47)

This invention relates to electrical telemetering systems in which a movable member is caused to be accurately positioned in accordance with a measurable condition, and has particular application to systems for maintaining the spin axis of a gyroscope in a predetermined orientation with respect to the earth.

Those versed in the gyroscope art are aware that the spin axis of a vertical gyroscope must be maintained accurately vertical if the gyro is to perform its function of sensing the direction of the zenith, and that the spin axis of a directional gyro must be maintained reasonably horizontal to prevent the accumulation of too large amounts of precessional errors and minimize the possibility of a gimbal lock condition occurring during turns. Such systems for controlling the orientation of the spin axis of gyroscopes are commonly known as erection systems.

Erection systems usually comprise three basic elements: a signal pickoff which senses the departure of the gyroscope spin axis from a predetermined orientation, a torque motor which applies a correcting torque to the gyroscope about one of its axes of suspension to reorient it, and an amplifier which controls the torque motor in accordance with signals from the pickoff. Signals derived from the pickoff are phase-characterized, i.e., the phase of the derived signal with respect to a reference signal depends upon the direction of departure of the gyroscope from its predetermined orientation. An amplifier should be able to respond to this phase-characterized signal to drive the torque motor to produce substantially full erecting torques upon very small angular deviations of the gyroscope from its correct orientation. In prior erection systems, however, and even in those employing high-gain amplifiers having two or more stages of amplification, full erecting torque is not achieved until the gyroscope spin axis has departed from its correct orientation by as much as 3° to 5°. Attempts to reduce the power requirements and weight of the amplifier, both important considerations in airborne systems, by reducing the number of amplification stages have resulted in an even greater angular departure of the spin axis from its predetermined orientation before the erection system can apply the full correcting torque. Hence, there is usually an area of low erection sensitivity or "dead band" at small angular deviations in which area the correcting torques are insufficient to overcome the static bearing frictions of the gyro suspensions. This may result in the gyroscope remaining misoriented for long periods of time.

In a horizon gyroscope, for example, carried by a jet aircraft in smooth flight at a constant heading, passage of the craft over the earth's surface as well as the turning of the earth about its axis will result in a fairly steady rate of departure of the gyroscope spin axis in a single direction away from the true vertical. Consequently, the erection system, in an attempt to correct this, will apply precession torques in only one direction to urge the spin axis toward the vertical; but because the torques of most erection systems decrease to zero as the null condition is approached, the gyroscope spin axis will not quite reach a vertical attitude and will maintain a fairly constant deviation from the true vertical. This deviation, integrated over sustained periods of time, will cause an accumulation of error in the system, resulting in inaccurate navigational information being supplied by the system.

The same horizon gyro, with its associated erection system under ground test on a roll-pitch-yaw machine will exhibit very little of this accumulated error since the movement of the gimbals will simultaneously disturb the static bearing frictions and result in the application of correcting precessional torques in opposite directions at different times. Similarly, when the gyroscope is carried by an aircraft in rough flight or one powered by a reciprocating engine, the oscillation and vibration experienced by the gyroscope will act to reduce effective bearing frictions and cause torque to be applied in opposite directions at different times.

Even in reciprocating engine craft, however, another source of accumulated error called "brinelling" may result after the gyroscope has been in operation for some time. The vibration of a reciprocating engine craft, while initially improving the dead band performance of an erection system, can ultimately result in the deterioration of that same performance. When such a craft is flown at a constant heading for long periods of time and the gyroscope is therefore maintained in substantially an invariable attitude, the vibration between balls and ball races in the delicate gyroscope bearings can cause depressions to be formed in the races. This phenomenon is known as brinelling because of its similarity to the operation of a Brinell hardness tester in which a hard steel ball is driven into a material under test to determine its hardness. The depressions so formed in the ball races, can, by increasing the peak bearing frictions, eventually increase the width of the dead band, and cause the accumulation of large errors.

These sources of accumulated error are not peculiar only to gyro erection systems but may appear in any telemetering arrangement where a changing condition is sensed by an electrical signal generating means and where a motor is driven by the amplified signal to cause reorientation of a movable member in response to the changing condition. Within this category falls also the azimuth correction system in a compass controlled directional gyroscope in which significant errors may be accumulated in operation. Likewise, telemetered position indicating arrangements in a flowmeter, for example, in which the angular position of a deflectable vane is a measure of the rate-of-flow of a fluid may be subject to the same sources of accumulated error. It will be apparent, therefore, that while this invention, for the sake of convenience, is to be described with some particularity in connection with a directional gyro levelling system, the invention is susceptible of a much broader application within the scope of these teachings.

In accordance with the principles of this invention, I propose in one embodiment to provide a highly regenerative oscillating amplifier in a directional gyro levelling system which induces oscillating or "hunting" movements of the gyroscope spin axis transversely through the plane of the horizon. As will be more fully set forth herein, by this arrangement I propose to eliminate peaking of bearing frictions caused by brinelling and to cancel the dead band effects resulting from operation of the gyroscope under very steady conditions.

It is, accordingly, an object of this invention to provide a system for accurately positioning a rotatable member which, by inducing oscillation of the rotatable member transversely about a predetermined position, significantly reduces the accumulation of errors in the system.

It is a further object of this invention to provide a gyroscopic spin axis transversely about its correct predeand high gain which, by inducing oscillations of the gyroscope spin axis transversely about its correct predetermined orientation, effectively eliminates sources of accumulated error in the erection system.

The invention has as another of its objects to provide in a system for accurately positioning a rotatable member an oscillating discriminator amplifier in which a comparatively small phase-reversed input signal is capable of regaining control of the amplifier after oscillation has begun.

Still another object of the invention is to provide a system for accurately positioning a rotatable member which is powered exclusively by alternating current requiring neither an external nor an internal D.C. power supply.

By way of a brief summary of but one embodiment of this invention, I provide a directional gyroscope levelling system having a levelling pickoff which generates signals whose phase characteristics with respect to a reference potential are a measure of the direction of departure of the gyroscope's spin axis from the horizontal. This signal is applied as an input signal simultaneously to the grids of a balanced twin triode amplifier whose output supplies the control phase winding of a conventional reversible two-phase torque motor. The fixed phase winding of the torque motor is supplied with its reference signal by being connected between ground and one tap of a three-phase power supply while the remaining two taps of the power supply energize an autotransformer having a grounded center tap. The plates of the twin triodes are supplied with A.C. potentials equal in magnitude but opposite in phase from opposite terminals of the autotransformer. The grids are likewise A.C. biased but with polarities opposite to those of their associated plates and the cathodes are connected together equipotentially. In this construction, the output signals appear between the cathodes and ground and between these points is connected the control phase winding of the torque motor. Additional turns on the control phase winding supply a correctly phased regenerative feedback signal in series with the pickoff, the input signal source. As a result of the phase relationships in this circuit, only one of the triodes can be conducting at any particular moment and the torque motor becomes phase sensitive to whichever tube is conducting. Furthermore, the relationships between the feedback signal and the phasing and magnitudes of the triode potentials is such that regenerative oscillation takes place if either of the triodes is once caused to conduct by the input signal. But because the conduction of a triode is periodically interrupted by the A.C. plate voltage, the input signal can regain control and cause oscillation in the other triode, since during these interruptions the other triode is capable of being made conducting by an oppositely phased signal.

In operation then, upon departure of the gyro spin axis from the horizontal, a phase-characterized signal is induced in the input circuit which causes one or the other of the balanced triodes to oscillate, thereby energizing the control phase winding of the torque motor to precess the gyro back toward a null position. Once having reached this null position, the pickoff ceases to supply an input signal, but the amplifier continues to oscillate because of the positive feedback, and the torque motor continues to precess the gyro rotor structure through and beyond its predetermined orientation. Having passed beyond the neutral position, an oppositely phased signal is fed into the amplifier from the pickoff, causing the other of the two triodes to conduct and forcing the amplifier to oscillate with an opposite phase. The torque motor, then, is energized to cause precession of the gyro in the opposite direction toward the null. It is apparent, then, that the torque motor will induce oscillatory movements of the gyroscope spin axis transversely about its predetermined or null orientation.

Although the scope of this invention is not to be limited except by a fair interpretation of the appended claims, further details of the invention, as well as additional objects and advantages, may perhaps be better understood in connection with the accompanying drawings, wherein:

Figure 1:
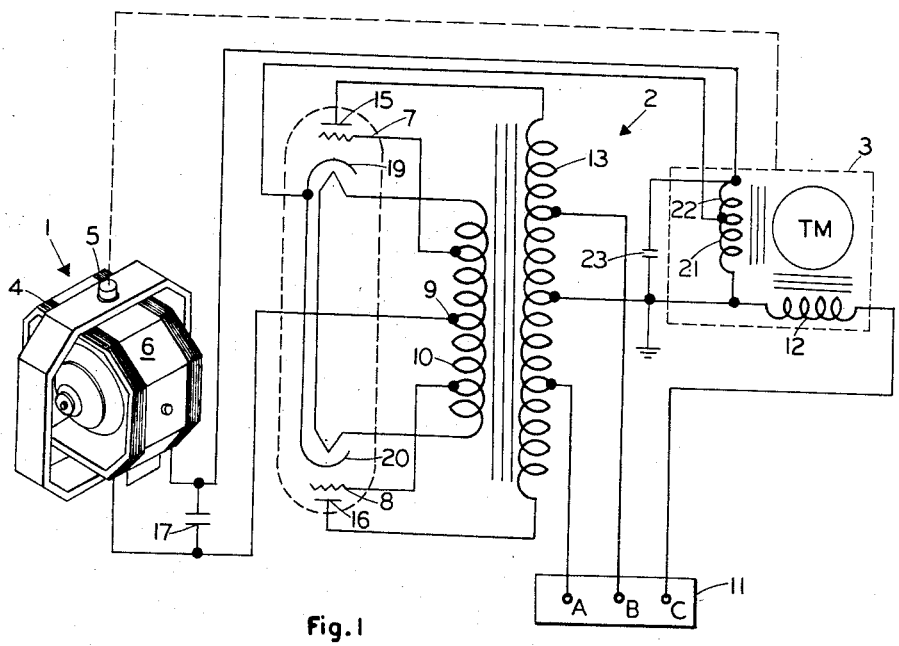
Figure 1 is a schematic diagram representing a preferred gyroscope levelling system constructed in accordance with the principles of this invention.

Turning first to the illustrative embodiment of these teachings shown in Figure 1, there may be seen a directional gyro levelling system in which a signal pickoff arrangement on gyroscope 1 controls a discriminator amplifier 2 which, in turn, governs a torque motor 3 to precess the gyro rotor structure. Although other pickoff arrangements may be employed, I prefer to provide a pickoff which utilizes the leakage flux of an electrical gyroscope rotor motor to link and induce characteristic electrical signals in windings mounted on the main gimbal of the gyroscope. In such an arrangement a pickoff rotor or exciting means function is served by the gyro motor itself, and no separate pickoff excitation signal is required. In this example a pair of substantially annular coils 4 and 5 are mounted in planes parallel with the main gimbal 6 and major axis of a three-axis directional gyroscope. Leakage flux from the stator windings of an alternating current gyro rotor motor pivotally supported in the main gimbal links the coils mounted on the main gimbal to induce electrical output signals characterizing the angular relationship between the coils and rotor spin axis with which the motor flux pattern is concentric. Further details of such a pickoff arrangement and a particularly useful rotor structure may be seen in my prior Patents 2,737,054 for "Gyro Pick-Off" and 2,731,836 for "Symmetrical Gyroscope," both assigned to the same assignee as that of the present application.

The phase-characterized signals thus derived are introduced simultaneously to grids 7 and 8 of the balanced twin-triode discriminator amplifier 2 through the center tap 9 of a transformer winding 10. The grid signals are amplified to control torque motor 3 in the following manner. Power for the amplifier is provided by terminals A and B of three-phase power supply 11 while the third terminal C provides an alternating current for the fixed phase winding 12 of the torque motor. With terminals A and B connected to transformer winding 13, it will be immediately apparent that A.C. potentials are applied by autotransformer action to plates 15 and 16 of the balanced twin triode. The plate potentials thus applied will be out of phase with each other; that is, when one plate has a positive polarity, the other plate potential will be negative. Under such conditions, it is possible for only one of the two triode sections to be conducting at any instant. In addition to the input signal derived from the gyroscope pickoff, a grid bias will be applied by transformer winding 10 to each of the triode grids. These grid biases will be equal in magnitude but of opposite polarity to one another.

Figure 2:
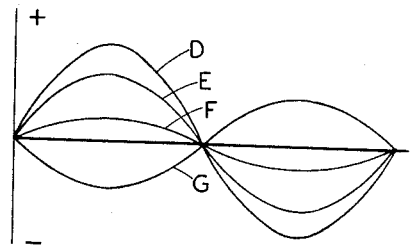
Figure 2 is a graphic representation of some of the phase relationships present in Figure 1.

The relative phasing between the grid bias and plate potential will be better understood in connection with Figure 2 where curve D represents the instantaneous potential on plate 15 and curve G represents the bias applied to grid 7. The grid bias, it can be seen, is out of phase with the plate potential and its magnitude is adjusted so that, unaided by any other signal, the grid effectively prevents the triode from conducting. The potentials on plate 16 and grid 8 will, as previously stated, be equal to, but opposite in polarity from the potentials represented by curves D and G. Condenser 17 is selected to adjust the phasing of the input signal derived from the gyro pickoff; this signal, when properly adjusted, will be in phase with the grid bias on one of the two triodes. On the grid of the other triode, however, this signal will be out of phase with the grid bias and will decrease the grid potential to a point where that triode begins to conduct. The grid signal is represented by curve F in Figure 2. If, then, the upper triode in Figure 1 is caused to conduct as a result of the input signal, a current will flow from ground through the upper section of transformer winding 13 to plate 15 and thence to cathode 19 through the control phase winding 21 of the torque motor back to ground. If an oppositely phased input signal is applied, the lower triode section in Figure 1 will conduct instead and an output current of an opposite phase will be supplied through the lower section of transformer 13. The torque motor 3 is a conventional reversible two-phase torque motor which applies torque in one direction or another about the major axis of the directional gyro, depending upon the phasing of the control signal received by it. Although it may appear that the terms "conducting" and "unconducting" as used herein refer to absolute conditions, those skilled in the art to which this invention pertains will readily appreciate that these expressions are really relative in nature. That is to say that when a triode is referred to as "conducting," it is carrying a significantly greater signal than the "unconducting" triode.

An additional winding section 22 on the control phase side of torque motor 3 picks off a portion of the output signal and feeds it back regeneratively to the input circuit. The phasing of the feedback signal is illustrated by curve E in Figure 2. Condenser 23 across the control phase winding of the torque motor is supplied for the purpose of smoothing out the wave form of the output and, hence, the feedback signal which otherwise could be severely distorted. The amplitude of the feedback signal is of a sufficient magnitude such that if the grid signal is removed, the amplifier will continue to oscillate in one phase sense through one of the triode sections. In the instant gyro system, this will have the effect of continuing to apply a precessional torque to the gyro after the spin axis has been returned to perpendicularity with respect to the major gimbal. Accordingly, the gyro will continue to precess through and beyond the neutral position. Once having passed beyond this point, however, the gyro pickoff will have induced in it a signal of opposite polarity to that which it had previously experienced and the new signal will be phased such that the other, previously unconducting triode section will tend to conduct. In an ordinary oscillating amplifier a signal of considerable magnitude would be required to overcome oscillation in the amplifier and to bring about a new oscillating condition in an opposite phase to the oscillation previously established. In this amplifier, however, the plate potentials are periodically reversed and it is during the period when the plate potential in the conducting section has become negative that the newly phased input signal tends to cause the other triode section to conduct. Therefore, but a small input signal is required to overcome oscillation in this amplifier and cause the discriminator to oscillate in the opposite phase.

I am aware that prior control systems of this general classification have been devised which utilize a regenerative feed-back characteristic in a discriminator amplifier to increase the sensitivity of response to an input signal. Some of these amplifiers have even been termed oscillators but it has been the practice to bias the amplifier substantially to, but slightly below, the point at which it will oscillate. The reason for this has been that if the amplifier were allowed to oscillate, the input signal would not be able to regain control of the amplifier. As a result, although the sensitivity of such control systems may have been improved by regenerative feedback, the dead band or null operation condition has not been removed.

Figure 3:
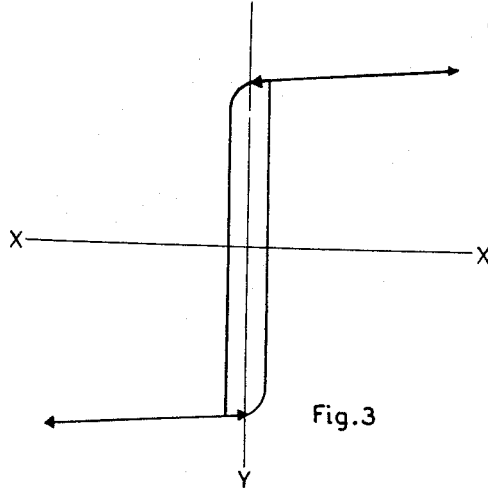
Figure 3 is a graph representing the torques applied by the levelling system of Figure 1 at different angular orientations of the gyroscope spin axis.

It will be seen that because the amplifier in the system described in connection with Figure 1 is permitted to oscillate, a hunting or oscillating motion of the gyroscope spin axis will be induced transversely through the horizontal, since, upon departure of the spin axis in one direction from the horizontal, a signal will be produced which will cause precession of the gyroscope through and beyond the null position. The torque displacement characteristics of this system are illustrated graphically in Figure 3 wherein the X coordinate represents angular displacement of the spin axis in either direction from the horizontal and the Y axis represents resulting precessional torques applied by the torque motor. The width of the loop in this curve represents the amount of permissible oscillation of gyro spin axis. In a levelling system of a directional gyroscope, this oscillation can be from 1 to 3 degrees without significantly affecting the accuracy of the system. In a horizon gyro, however, the oscillation should be no more than a quarter of a degree since otherwise the horizon indication would be significantly affected. Obviously, different systems will have different requirements. To control the width of the loop, i.e., degree of permissible oscillation, the phase relationships of the voltages may be varied by varying the circuit parameters.

Important benefits result from the induced hunting motion. Thus, since the gyroscope is not permitted to remain fixed at a single heading for long periods of time, a gyroscope system of this nature carried by a reciprocating engine craft will not suffer from the effects of brinelling previously described. This results because the balls and ball races in the gyroscope bearings are not permitted to remain in fixed relative positions such that continued vibrations will result in the formation of detents along discrete portions of the ball race. Furthermore, in a gyro system carried by an aircraft in smooth flight, the periodic departure in opposite directions of the gyroscope spin axis from its horizontal position will result in an averaging action which prevents the accumulation of integrated precessional errors over long periods of time. Similar advantages result in other systems in which a rotatable member is positioned in accordance with a measured condition.

Figure 4:
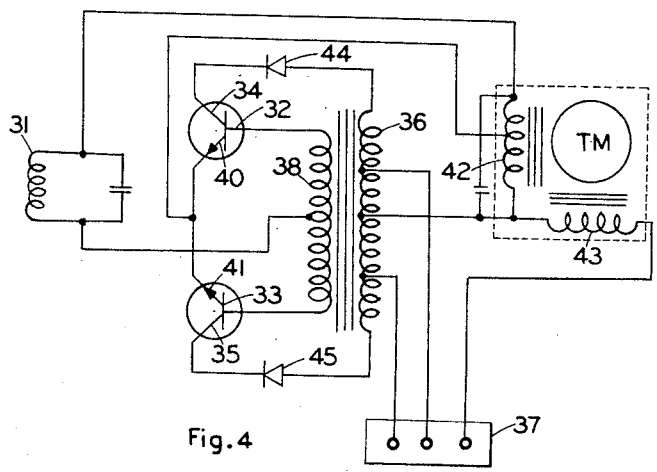
Figure 4 is a schematic diagram representing a transistorized version of the amplifier circuit of Figure 1.

For those applications of the system described in Figure 1 where reduction of weight is much to be desired, a transistorized version of the amplifier such as that shown in Figure 4 may be preferred, and the operation of the system will not be changed appreciably. An error signal is produced in the same way by pickoff winding 31 and applied simultaneously to the base or control electrodes 32 and 33 of a pair of transistors in a balanced discriminator amplifier. Alternating potentials are applied to the anodes, in this case collector electrodes 34 and 35, by transformer winding 36 energized, as before, from two terminals of a three-phase power supply 37. The base electrodes are biased in the same manner as the grids in the previous illustration by transformer winding 38, and a signal from either of the cathodes, either from emitter 40 or from emitter 41 depending on the phasing of the input signal, energizes the control phase winding 42 on the torque motor. Feedback is accomplished in the same manner as previously described and the fixed phase winding 43 of the torque motor is similarly excited from the third terminal of the power supply. Diodes 44 and 45 are connected in the collector circuits to prevent damage to the transistors from reverse currents which would otherwise flow through them. It may also be necessary to supply similar diodes in the base circuits, but if the base currents are small, the latter can be omitted.

Figure 5:
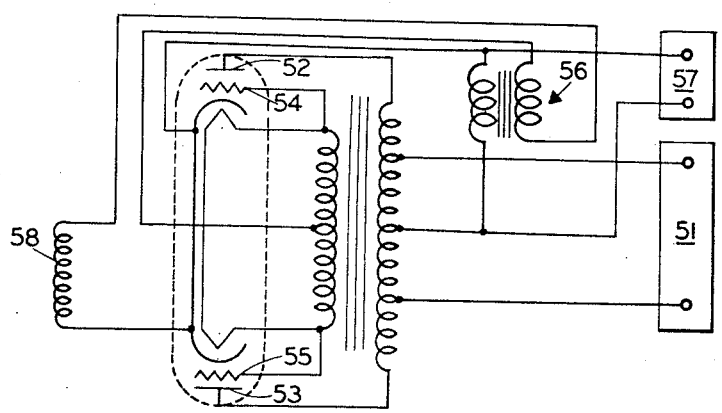
Figure 5 is a schematic diagram representing an alternative form of amplifier which may be used in the practice of this invention.

It should not be felt that the practice of this invention is necessarily limited to the use of an amplifier having the precise circuit relationships shown in Figures 1 and 4. In Figure 5, for example, an alternative amplifier construction, which is useful in a system embodying the principles of this invention, is shown as being energized conveniently from a single phase alternating current power supply 51. The potentials applied to the plates 52, 53 and grids 54, 55 of the balanced twin triode are here substantially identical to those described in connection with Figure 1, but the feedback signal is derived from a transformer 56 inserted in parallel with the load 57. Load 57 may be any phase-responsive reversible motor means such as the conventional two-phase torque motor referred to in connection with Figures 1 and 4, and may derive its reference potential from source 51.

The general operation of this circuit is similar to that previously described; signal generating means 58 develops a phase-characterized signal indicative of a change in a condition such as the departure of the gyro spin axis from a predetermined orientation. The A.C. bias on grids 54 and 55 permits the phasing of the input signal to determine which section of the balanced twin triode will amplify. Once a triode section begins to conduct, the regenerative feedback connections from transformer 56 will cause an oscillation in the amplifier which will continue after the rotor structure or other movable body is repositioned by the motor means and the input signal ceases. The amplifier will therefore continue to drive the torque motor until the rotor structure or other movable body is again mis-oriented and a phase-reversed input signal is applied to the input circuit. Because the A.C. plate potential results in a periodic interruption of the signal amplification in the conducting section of the amplifier, the phase-reversed input signal can regain control of the amplifier by causing oscillation in the other section of the amplifier, thereby causing the motor means to drive the movable body in the reverse direction.

Figure 6:
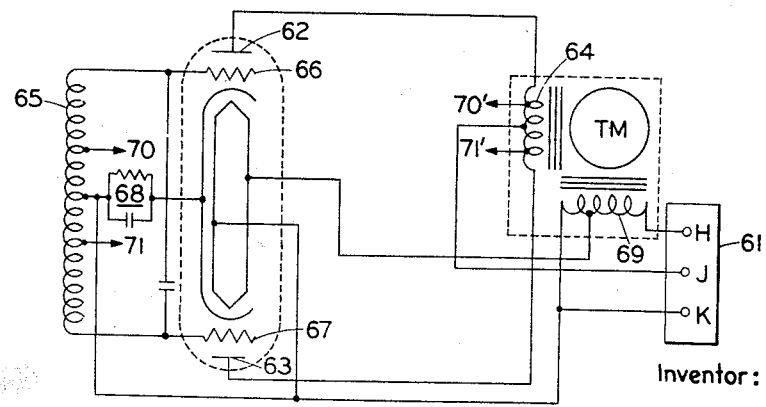
Figure 6 is a schematic diagram of still another amplifier arrangement which may be used in the practice of this invention.

In Figure 6 still another discriminator-amplifier is shown which may be used in the practice of this invention. Here, terminal J of three-phase power supply 61 provides A.C. plate potentials of the same polarities and magnitudes to plates 62 and 63 of a balanced twin triode amplifier through the center tap of control phase winding 64 on the torque motor. Signal generating means 65 applies an input signal to the amplifier which signal appears on grids 66 and 67 with opposite phase characteristics; hence, grid 66 will be driven positive while grid 67 is being driven negative and vice-versa. That triode in which the grid and plate potentials are substantially in phase will conduct, the other triode being prevented from conducting by the combined grid signal and the D.C. bias supplied by R-C network 68. The conducting triode will, by energizing the top or bottom section of winding 64 supply the control phase signal to the torque motor, the fixed phase being supplied to winding 69 from terminals H and K of the three-phase power supply. Regenerative feedback connections, omitted for the purpose of simplifying the drawing, run from terminal 70 to 70′ and from 71 to 71′. It can be seen that this amplifier, too, will oscillate with the phase sense of an applied input signal and will continue to oscillate after the removal of that signal. But because the plate potential periodically reverses, cutting off amplification in the circuit, a phase reversed input signal is enabled to regain control of the amplifier and cause it to oscillate with an opposite phase sense. Hence, the rotor structure or whatever other movable member is driven by the torque motor will necessarily be caused to move in an oscillatory manner.

While I have shown and described certain embodiments of the invention herein disclosed, it should be understood that these are purely illustrative in nature and that other arrangements may be constructed in accordance with these teachings. For example, if an oscillating amplifier is used which is otherwise too highly regenerative to permit a phase reversed input signal to regain control, amplification may be periodically interrupted by an intermittent switching arrangement such as a thermal switch, an electromagnetic vibrator, or a ferro-resonant switching device inserted in any critical portion of the circuit. These and other variations within the spirit and scope of the invention defined by the following claims will doubtless occur to those skilled in the art to which this invention relates.

What I claim as new and desire to secure by Letters Patent of the United States is:

1. In combination: a movable member to be accurately positioned in accordance with a measured condition; signal generating means developing a phase-characterized signal indicating displacement between the position of said member and a position corresponding to the condition under measurement; a discriminator amplifier responsive to said phase-characterized signal and having regenerative feedback connections causing said amplifier to continue to oscillate electrically in the phase sense of said signal after the cessation of said signal; and reversible motor means governed by said amplifier for urging said movable member in one of two directions depending on the phase-sense of the oscillation in said amplifier, whereby said movable member is caused to perform oscillatory movements transversely about a position corresponding to said condition under measurement.

2. In combination: a gyro rotor structure having a spin axis and supported for rotation about at least one support axis; signal generating means deriving a periodically varying phase-characterized signal characterizing the direction of departure of said spin axis from a predetermined orientation; a discriminator amplifier responsive to said phase-characterized signals and having regenerative feedback connections causing said amplifier to continue to oscillate electrically in the phase sense of said signal after the cessation of said signal; reversible torque motor means governed by said amplifier for urging said rotor structure in one of two directions depending on the phase sense of the oscillation in said amplifier; whereby the spin axis of said rotor structure is caused to perform oscillatory movements transversely about said predetermined orientation.

3. In combination: a movable member to be accurately positioned in accordance with a measured condition; signal generating means developing a periodically varying phase-characterized input signal indicating displacement between the position of said member and a position corresponding to the condition under measurement; reversible motor means for urging said movable member to assume various positions in accordance with said measured condition; and an oscillating discriminator amplifier having an input circuit connected to said signal generating means, an output circuit controlling said reversible motor means, regenerative feedback connections causing said discriminator amplifier to continue to oscillate after the cessation of said input signal, and means periodically interrupting signal amplification in said amplifier to permit a phase-reversed input signal to reverse the phase sense of oscillation in said discriminator amplifier.

4. In combination: a movable member to be accurately positioned in accordance with a measured condition; signal generating means developing a periodically varying phase-characterized signal indicating displacement between the position of said member and a position corresponding to the condition under measurement; reversible motor means for urging said movable member to assume various positions in accordance with said measured condition; and an oscillating discriminator amplifier having an input circuit connected to said signal generating means, an output circuit controlling said reversible motor means, and comprising a pair of balanced twin amplifier circuits electrically biased such that the phasing of said phase-characterized signal determines which of said amplifier circuits is permitted to conduct signals, regenerative feedback connections causing said discriminator amplifier to continue to oscillate after the cessation of said input signal, and means periodically interrupting signal amplification in said twin amplifier circuits to permit a phase reversed input signal to reverse the phase sense of oscillation in said discriminator amplifier.

5. In combination: a gyro rotor structure having a spin axis and supported for rotation about at least one additional axis; signal generating means developing a periodically varying phase-characterized input signal upon departure of said rotor structure from a predetermined orientation about said support axis; reversible torque motor means for reorienting said rotor structure; and a discriminator amplifier having an input circuit connected to said signal generating means and an output circuit controlling said reversible motor means comprising a pair of balanced twin amplifier circuits electrically biased such that the phasing of said phase-characterized signal determines which of said amplifier circuits is permitted to conduct signals, regenerative feedback connections causing said discriminator amplifier to continue to oscillate after the cessation of said input signal, and means periodically interrupting signal amplification in said twin amplifier circuits to permit a phase-reversed input signal to reverse the phase sense of oscillation in said discriminator amplifier.

6. In combination: a movable member to be accurately positioned in accordance with a measured condition; an oscillating discriminator amplifier arrangement having an input and an output circuit and comprising a pair of balanced electrical amplifier circuits; signal generating means in said input circuit applying to each of said amplifier circuits a periodically varying phase-characterized input signal indicating displacement between the position of said member and a position corresponding to the condition under measurement; means electrically biasing said amplifier circuits such that the phasing of said input signal determines which of said amplifier circuits amplifies said input signal; reversible motor means in said output circuit for urging said movable member to assume various positions in accordance with the measured condition, the circuit connections in said output circuit being such that said motor means urges said rotatable member in one of two directions when one of said amplifier circuits amplifies said input signal and in the other of said two directions when the other of said amplifier circuits amplifies said input signal; regenerative feedback connections causing said amplifier arrangement to continue to oscillate after the cessation of said input signal; and power means intermittently and alternately energizing said amplifier circuits, thereby periodically interrupting oscillation to permit a phase-reversed input signal to reverse the phase sense of oscillation in said amplifier arrangement.

7. In combination: a movable member to be accurately positioned in accordance with a measured condition; a discriminator amplifier arrangement having an input and an output circuit and comprising a pair of balanced electrical valves, each of said valves having cathode, anode and control electrodes; means supplying periodically reversing potentials of opposite phase characteristics to said anodes simultaneously; signal generating means in said input circuit applying simultaneously and in the same phase to each of said control electrodes a periodically varying phase-characterized input signal indicating displacement between the position of said member and a position corresponding to the condition under measurement; means electrically biasing said control electrodes such that the phasing of said input signal determines which of said valves is permitted to conduct electrically; reversible motor means in said output circuit for urging said movable member to assume various positions in accordance with the measured condition, the circuit connections in said output circuit being such that said motor means urges said rotatable member in one of two directions when one of said valves is conducting and in the other of said two directions when the other of said valves is conducting; regenerative feedback connections causing said amplifier to continue to oscillate in phase with the applied signal after the cessation of said signal, whereby said movable member is caused to oscillate transversely about a position determined by said measured condition.

8. In combination: a gyro rotor structure having a spin axis and supported for rotation about at least one support axis; a discriminator amplifier arrangement having an input and an output circuit and comprising a pair of balanced electrical valves, each of said valves having cathode, anode and control electrodes; means supplying periodically reversing potentials of opposite phase characteristics to said anodes simultaneously; signal generating means in said input circuit applying simultaneously and in the same phase to each of said control electrodes a periodically varying phase-characterized input signal characterizing the direction of departure of said spin axis from a predetermined orientation; means electrically biasing said control electrodes such that the phasing of said input signal determines which of said valves is permitted to conduct electrically; reversible motor means in said output circuit for urging said rotor structure to assume various orientations in accordance with the measured condition, the circuit connections in said output circuit being such that said motor means urges said rotor structure in one of two angular directions about said support axis when one of said valves is conducting and in the other of said two angular directions when the other of said valves is conducting; regenerative feedback connections for causing said amplifier to continue to oscillate in phase with the applied signal after the cessation of said signal whereby said spin axis is caused to oscillate transversely about said predetermined orientation.

9. In combination: a movable member to be accurately positioned in accordance with a measured condition; a discriminator amplifier arrangement having an input and an output circuit and comprising a pair of balanced electrical valves, each of said valves having cathode, anode and control electrodes; means supplying periodically reversing potentials of opposite phase characteristics to said anode simultaneously; signal generating means in said input circuit applying simultaneously and in the same phase to each of said control electrodes a periodically varying phase-characterized input signal indicating displacement between the position of said member and a position corresponding to the condition under measurement; means electrically biasing said control electrodes such that the phasing of said input signal determines which of said valves is permitted to conduct electrically, the instantaneous bias potential on each control electrode being opposite in polarity to the potential on the anode associated therewith; reversible motor means in said output circuit for urging said movable member to assume various positions in accordance with the measured condition, the circuit connections in said output circuit being such that said motor means urges said rotatable member in one of two directions when one of said valves is conducting and in the other of said two directions when the other of said valves is conducting; regenerative feedback connections causing said amplifier to continue to oscillate in phase with the applied signal after the cessation of said signal.

References Cited in the file of this patent

UNITED STATES PATENTS

| | | |
|---|---|---|
| 2,382,993 | Haskins | Aug. 21, 1945 |
| 2,437,064 | Andresen | Mar. 2, 1948 |
| 2,737,054 | Wendt | Mar. 6, 1956 |
| 2,745,288 | Konet et al. | May 15, 1956 |